Aug. 9, 1938.　　　　R. T. BELL　　　　2,125,866
METHOD OF MAKING WHEELS
Filed Nov. 21, 1936
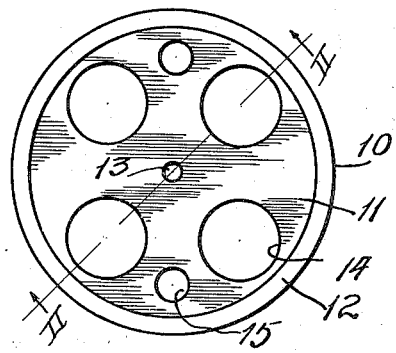
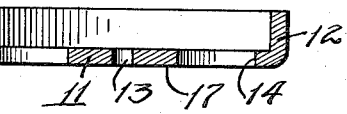
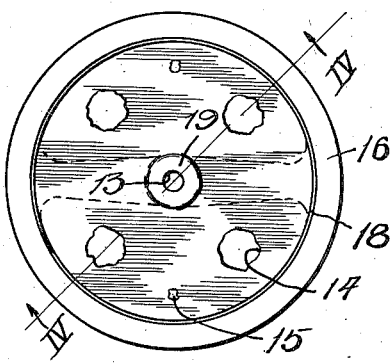
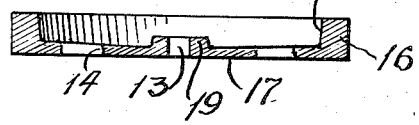
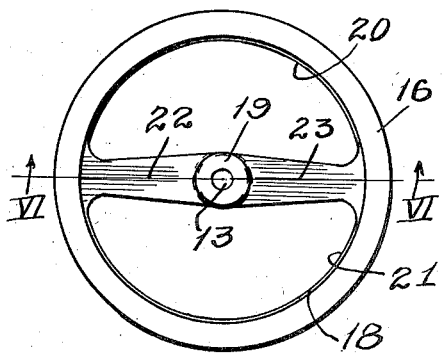
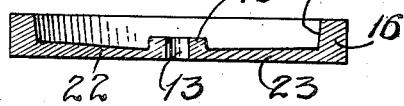
Inventor
Raymond T. Bell Patented Aug. 9, 1938

2,125,866

UNITED STATES PATENT OFFICE 2,125,866

METHOD OF MAKING WHEELS

Raymond T. Bell, Delavan, Wis., assignor to The George W. Borg Corporation, Chicago, Ill., a corporation of Delaware Application November 21, 1936, Serial No. 111,967

3 Claims. (Cl. 29—178)

The present invention is in general concerned with a wheel construction and improved method for making the same, and is more particularly concerned with the making of an improved wheel such as is utilized for a balance wheel in clocks and the like.

The ordinary form of clock balance wheel comprises a relatively heavy rim which is connected to a central hub portion by a pair of spokes disposed in diametrically opposed relationship.

In the manufacture of the balance wheel just described it has been the customary practice to turn the wheels out of circular bar stock material having a diameter the same as that of the finished wheel, by means of a cutting tool which is moved into the end of the stock and which forms the rim and hub portion of the wheel. The end of the rod is then sawed or otherwise cut off so as to give the proper width to the rim portion. The excess metal on each side of the part which is to form the spokes of the wheel is then removed and the wheel ground and burnished to produce a finished product. As a result, this manner of constructing clock balance wheels is relatively very expensive.

In the present invention, it is sought to provide an improved method for the making of a wheel structure, whereby wheels such as utilized for the balance wheel of a clock may be more economically manufactured.

A further object of the invention is to provide an improved method for making clock balance wheels from a sheet of flat metallic material.

Another object is to provide an improved method for making clock balance wheels and the like from a flat metallic sheet having a uni-directional grain and in which the grain of the metal in the finished wheel will be non-directional, whereby warping of the wheel is materially lessened.

Still another object is to provide an improved method of making wheels such as clock balance wheels and the like that permits the use of a relatively soft and workable metal, and which will result in a finished wheel composed of metal of substantially greater hardness.

It is also an object to provide an improved blank for use in the manufacture of wheel structures such as clock balance wheels by a coining or swaging process.

Although the present invention has been discussed more or less in detail in connection with the making of clock balance wheels, it will be readily apparent to those skilled in the art that the novel method described herein is susceptible of general application for the construction of other types of wheels without departing from the scope and spirit of the present invention.

Other objects of the invention will more fully appear from the following detailed description taken in connection with the accompanying drawing, which illustrates the various steps of my improved method, and in which:

Figure 1 is a plan view of a blank formed according to this invention, from which the wheel is made;

Figure 2 is a sectional view of the blank taken substantially on line II—II of Figure 1;

Figure 3 is a plan view of the blank after the coining or swaging operation;

Figure 4 is a sectional view of the same taken substantially on line IV—IV of Figure 3;

Figure 5 is a plan view of the completed wheel; and

Figure 6 is a sectional view of the completed wheel, taken substantially on line VI—VI of Figure 5.

As shown on the drawing:

According to this invention, a blank 10, as shown in Figure 1, is stamped or otherwise formed from a flat sheet of suitable metal. The blank so formed comprises a main bottom portion 11 of circular shape having a right angled flange 12 at its periphery. The thickness of the bottom portion and flange portion is substantially the same, and the bottom is provided with a plurality of apertures of different sizes.

A central aperture 13 is formed in the bottom, this aperture forming in the finished wheel an opening for receiving the shaft upon which the wheel is to be mounted. In addition to this aperture, there are also provided a plurality of substantially larger apertures 14 which are arranged in quadrature in the bottom portion of the blank, these apertures being disposed outwardly adjacent to the rim 12. Diametrically opposed of the central aperture 13 are intermediate size apertures 15 which likewise are disposed adjacent the rim portion 12. The apertures 14 and 15 are for the purpose of providing spaces into which excess metal may flow during the coining operation which is the next operation to be performed on the blank.

In the next step of the herein described method, the blank as shown in Figure 1 is inserted in a suitable die in which the blank under extremely high pressure is coined to form a partially completed wheel as shown in Figures 3 and 4. In this stage, the metal in the flange 12 has been upset to form a relatively heavy rim which is of less width and of greater thickness than the flange of the original blank. This rim is shown at 16, and it will be noted that the peripheral surface of the rim is at right angle to the lowermost surface 17 of the bottom. The inner surface of the rim is slightly bevelled as shown at 18.

During the coining operation, the bottom portion 11 is slightly thickened at its center to form a raised central hub 19, and the spoke forming portion is made slightly thinner and of increasing thickness from the hub to the rim. It will be noted that during this operation there will be a flowing of the metal in the various parts of the wheel, the metal in the bottom being forced outwardly towards the rim. The surplus metal will be forced into the apertures 14 and 15. As a matter of fact, these apertures will be substantially closed as a result of this operation. It will be noted in Figure 3 that in a position 90° from the diametrically opposed openings 15, there are diametrically opposed areas lying on each side of the hub portion which are free from perforations or openings. These areas permit the formation of oppositely extending inwardly tapered spokes for connecting the hub portion and the wheel rim, as shown in dotted lines.

In the final step of the method, the incomplete wheel as shown in Figure 3 is completed by cutting out the excess metal to form, in this instance, segmental openings 20 and 21 to define diametrically opposed spokes 22 and 23 which are integral at their inner ends with the hub portion 19 and are integrally connected at their outermost ends with the rim 16.

In the use of the method just described, it has been found that the blank may be formed from a relatively soft metal which may be readily worked, and that due to the coining operation, this relatively soft metal is increased in hardness. Moreover, the coining operation produces a finished surface, so that very little if any additional work is required to finish the surface of the wheel parts, thereby materially decreasing the cost of manufacture.

An additional advantage resulting from the practice of the herein described method is that the finished wheel is less subject to warping. The grain of the sheet material from which the blank is made is uni-directional in structure, but due to the coining operation in which a flowing of the metal takes place, the grain of the metal is rendered non-directional so that in the finished product, the wheel will not warp as in the case of a uni-directional grain in the metal.

From the foregoing description, it will be apparent that the present invention provides an improved method for making wheels such as clock balance wheels from a blank sheet of material, whereby such wheels may be more economically manufactured; a method which enables the making of a balance wheel from a sheet of metal having a uni-directional grain, and in which the finished wheel will contain metal having a non-directional grain, whereby warping of the wheel is substantially eliminated; and in which an initially soft metal may be used, this metal being hardened in the finished product as a result of the practice of the herein described method; and which may be practiced by utilizing modern manufacturing methods such as coining or swaging.

It is, of course, to be understood that although I have described in detail the various steps of the method of my invention, the invention is not to be thus limited, but only insofar as defined by the scope and spirit of the appended claims.

I claim as my invention:

1. The method of making a balance wheel which consists in stamping from a flat metal sheet a circular blank having a peripheral flange and apertured bottom respectively of the same thickness as the original metal sheet, said apertures of the bottom being disposed on either side of portions thereof to be utilized in forming spokes for said wheel, coining this blank to upset the flange and bottom to form a thickened rim and a bottom of varying thickness, said apertures being adapted to receive surplus metal resulting from the coining operation, and thereafter removing portions of the bottom containing said apertures to form wheel spokes.

2. The method of making a balance wheel which consists in stamping from a flat metal sheet a circular blank having a peripheral flange and apertured bottom respectively of the same thickness as the original metal sheet, said apertures of the bottom being disposed on either side of portions thereof to be utilized in forming spokes for said wheel, coining this blank to upset the flange and bottom to form a thickened rim and force metal radially outwardly in the bottom to form a bottom increasing in thickness from its center towards the rim, said apertures being adapted to receive surplus metal resulting from the coining operation, and thereafter removing portions of the bottom containing said apertures to form wheel spokes.

3. The method of making a balance wheel which consists in stamping from a flat sheet a circular cup-shaped blank having a right-angled peripheral flange and apertured bottom respectively of the same thickness as the original metal sheet, said apertures being disposed adjacent said flange on either side of the bottom portions to be utilized in forming spokes for said wheel, coining this blank to upset the flange and bottom to form a thickened rim and a bottom having the plane of its outer surface normal to the central axis of the blank and its inner surface radially inclined to said axis, said apertures being adapted to receive surplus metal resulting from the coining operation, and thereafter removing portions of the bottom containing said apertures to form wheel spokes.

RAYMOND T. BELL.